US006144121A

United States Patent [19]

Ishida et al.

[11] Patent Number: 6,144,121

[45] Date of Patent: *Nov. 7, 2000

[54] MOTOR-DRIVEN TOOLS

[75] Inventors: Yosuke Ishida; Natsuhara Tsutomu, both of Shiga, Japan

[73] Assignee: Matsushita Electric Works Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/059,422

[22] Filed: Apr. 14, 1998

[30] Foreign Application Priority Data

| | | | |
|---|---|---|---|
| Apr. 23, 1997 | [JP] | Japan | 9-106475 |
| Nov. 14, 1997 | [JP] | Japan | 9-314043 |

[51] Int. Cl.[7] .............................. H02K 7/14; H02K 9/00; H02K 1/32

[52] U.S. Cl. ................................ 310/50; 310/47; 310/59; 310/62; 310/63; 310/64

[58] Field of Search ................................ 310/47, 58, 59, 310/62, 63, 64, 65, 50, 60 R, 71, 239

[56] References Cited

U.S. PATENT DOCUMENTS

| | | | |
|---|---|---|---|
| 2,212,342 | 8/1940 | Forss | 310/62 |
| 3,127,533 | 3/1964 | Gardner, Jr. | 310/239 |
| 3,344,291 | 9/1967 | Pratt | 310/50 |
| 3,652,879 | 3/1972 | Plunkett et al. | 310/50 |
| 3,710,154 | 1/1973 | Schilling | 310/50 |
| 4,095,131 | 6/1978 | Febonio | 310/239 |
| 4,179,644 | 12/1979 | Vassos | 318/17 |
| 4,418,295 | 11/1983 | Shiga | 310/59 |
| 5,043,614 | 8/1991 | Yockey | 310/68 D |
| 5,055,728 | 10/1991 | Looper et al. | 310/91 |
| 5,089,729 | 2/1992 | Moores, Jr. | 310/50 |
| 5,218,254 | 6/1993 | Someya | 310/71 |

FOREIGN PATENT DOCUMENTS

| | | |
|---|---|---|
| 1136606 | 5/1957 | France . |
| 409925 | 5/1934 | United Kingdom . |

OTHER PUBLICATIONS

Sears et al., University Physics, sixth edition, Addison–Wesley Publishing Company, pp. 539–540, 1982.

Patent Abstracts of Japan, vol. 005, No. 117, published Jul. 28, 1981.

*Primary Examiner*—Nicholas Ponomarenko
*Assistant Examiner*—Dang Dinh Le
*Attorney, Agent, or Firm*—Greenblum & Bernstein, P.L.C.

[57] ABSTRACT

A motor-driven tool is provided with a grip on which a switch is placed, and the grip is coupled to the middle of a cylindrical housing which houses a motor in its rear end and a motor output decelerator in front of the motor in its front end. A deceleration rotation output shaft is provided in the front of the housing. The motor houses an axial flow fan for air intake in the rear and a centrifugal fan for exhaust in the front and has intake air openings in the rear side and an exhaust air opening in a front side surface. The cylindrical housing also has an intake opening that connects to the intake air opening in the rear side of the motor and an exhaust opening that connects to the motor exhaust air opening at the position where the front of the motor is located. The exhaust opening of the housing may be directed upwardly and away from the tool grip, and the connection between a lead wire from the switch and the motor may be positioned adjacent either the intake air opening or the exhaust opening for effective cooling of the terminal. Additionally, an end plate of the motor, formed of a good heat conducting material, can close off the end surface of the motor, and thus may also serve as a radiator plate for a switching element positioned thereon, and the number of parts can be reduced because an independent radiator plate becomes unnecessary. A cooling vent opening may be provided in the end plate, and the cooling efficiency of the motor can be improved. Further, a mounting plate for attaching the decelerator may be mounted integrally with the end plate, and a separate mounting plate becomes unnecessary.

20 Claims, 13 Drawing Sheets

MOTOR-DRIVEN TOOLS

CROSS REFERENCE TO RELATED APPLICATIONS

The present disclosure relates to subject matter contained in priority Japanese Application Nos. HEI 9-106475 filed on Apr. 23, 1997 and HEI 9-314043 filed on Nov. 14, 1997, both of which are herein expressly incorporated by reference in their entireties.

BACKGROUND OF THE MENTION

1. Field of the Invention

The present invention relates to motor-driven tools, in particular hand-held motor-driven tools such as electric drills and electric drivers.

2. Description of Background Information

Hand-held motor-driven tools are in general constructed as shown in FIGS. 15(*a*) and 15(*b*) such that a motor 2 is housed in the rear of the cylindrical housing 1 connected at its middle to a grip 4. A switch trigger 50 and a switch that is opened and closed by manipulating the switch trigger 50 are located on grip 4. The motor 2, as shown in FIG. 15(*a*), has a centrifugal exhaust fan 8 mounted on the rear end of rotor 28 from which an output shaft 21 protrudes forwardly. An air intake opening 16 is formed in the front outer periphery of the housing 1 and an exhaust opening 18 is formed in the rear peripheral surface. An intake air opening 23*a* is provided in the rear end surface of the casing 25 of motor 2, and an exhaust air opening 23*b* is provided in the rear peripheral surface of the casing 25. Air sucked into housing 1 through air intake opening 16 in the front peripheral surface of housing 1 passes through the intake air opening 23*a* at the rear end of motor 2 and is sent into motor 2, then passes through exhaust opening 18 of housing 1 from exhaust air opening 23*b* of motor 2 and is exhausted as cooling air. W1 in FIG. 15(*a*) indicates intake air and W2 indicates exhaust air. Grip 4 is connected midway along the cylindrical housing in consideration of weight balance, and a connecting terminal connected to the power source through a switch on the motor 2 is mounted on the rear side, rather than on the front where output shaft 21 protrudes.

In this case, the air directed toward the intake air openings 23*a* on the rear of motor 2 from the intake openings 16 on the housing 1 passes through a long, narrow route between the inner peripheral surface of the housing 1 and the outer surface of the motor 2, and further must cross paths with the exhausted air exiting from exhaust air openings 23*b* on the motor 2. As a result, not only does cooling air sucked in through intake openings 16 of housing 1 flow intake air through openings 23*a* at the rear of motor 2, but heated air between the motor 2 and the housing 1 also flows through intake air openings 23*a*. Because there is no cool air flowing along the axis inside the motor, it is difficult to cool the inside of the motor 2, and hot air easily accumulates between the motor 2 and the housing 1. Elements through which current flows, such as the coil, commutator, and brush inside motor 2 which are the largest generators of heat, are not cooled sufficiently. This causes a reduction in the output capacity of motor 2 by raising the electrical resistance. Further, when using these motor-driven tools, the temperature of the outer shell of the housing 1 rises within a short time period, and the portion where the hand grips the tool below the motor 2 and the connection between the cylindrical housing and the grip 4 as well as the rear end of housing 1 where the hand is often in contact when the tool is in use become hot, and the air exhausted from exhaust openings 18 strikes the hand, causing discomfort to the user.

If a motor 2 in which an intake opening is provided in the front end also (not shown) is used, cooling air can pass through the inside of motor 2, but because a decelerator 3 for decelerating the output of motor 2 is connected to the front end of motor 2 in motor-driven tools, such intake opening would either be closed off by the decelerator 3, or the opening would be extremely small due to the need to make the structure compact, and it would be insufficient as a route for cooling air.

SUMMARY OF THE INVENTION

The present invention was developed upon consideration of these points, and aims to provide motor-driven tools with extremely high motor cooling efficiency, regardless of whether or not a decelerator is placed in front of the motor.

The present invention is directed to motor-driven tools in which a grip on which a switch is placed is provided on the middle of a cylindrical housing or casing which houses both a motor in its rear end and a decelerator which decelerates the motor output in front of the motor in its front end, and a deceleration rotation output shaft in the front of the housing. The motor houses an axial flow fan for air intake in the rear and a centrifugal fan for exhaust in the front and has an intake air opening in the rear side and an exhaust air opening in the front side surface. The cylindrical housing or casing has an intake opening that connects to the intake air opening in the rear side and an exhaust opening that connects to the exhaust air opening at the position where the front of the motor is located.

With the present invention, when the motor is rotated, air that passes through the intake opening in the rear of the housing and the intake air opening in the rear of the motor and enters inside the motor is sent to the front end inside the motor by an intake axial flow fan, and expelled outside through the exhaust air opening in the front of the motor and the exhaust opening in the side of the housing by an exhaust centrifugal fan. Regardless of whether there is a decelerator in front of the motor, cooling air can pass through the inside of the motor, and intake air and exhaust air can be prevented from crossing with each other.

Further, rising temperatures, due to heat generation of the wiring through which large amounts of current flow, can be prevented by positioning a connecting terminal connected to a switch on the motor adjacent the air openings.

In the motor equipped with both a connecting terminal connected to the switch and a commutator and brush on the front end from which the output shaft connected to the decelerator protrudes, the distance between the switch, located on the grip, and the connecting terminal of the motor can be shortened.

Additionally, in a tool that houses a switching element for driving the motor, the switching element may be positioned near the front of the motor. Thus, the distance between the switch, placed on the grip, and the switching element is shortened.

The switching element for driving the motor may be mounted to an end plate of the motor, formed of a good heat conducting material, that closes off the end surface of the motor. Therefore, the end plate may also serves as a radiator plate for the switching element, and the number of parts can be reduced because an independent radiator plate becomes unnecessary. A cooling vent opening may be provided in the end plate, and the cooling efficiency of the motor can be improved. Further, a mounting plate for attaching the decelerator may be mounted integrally with the end plate, and a separate mounting plate becomes unnecessary.

BRIEF DESCRIPTION OF DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

Figure 1B:
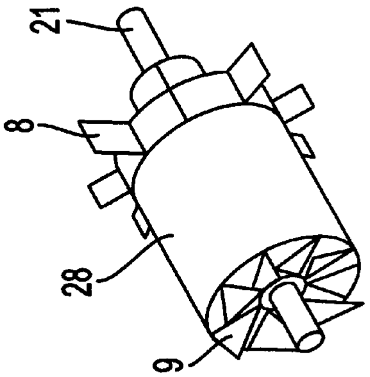
FIGS. 1(*a*) and (*b*) depict a first embodiment of the present invention, where FIG. 1(*a*) is a view of the tool motor and housing, and FIG. 1(*b*) is a perspective view of the motor rotor.
Figure 1A:
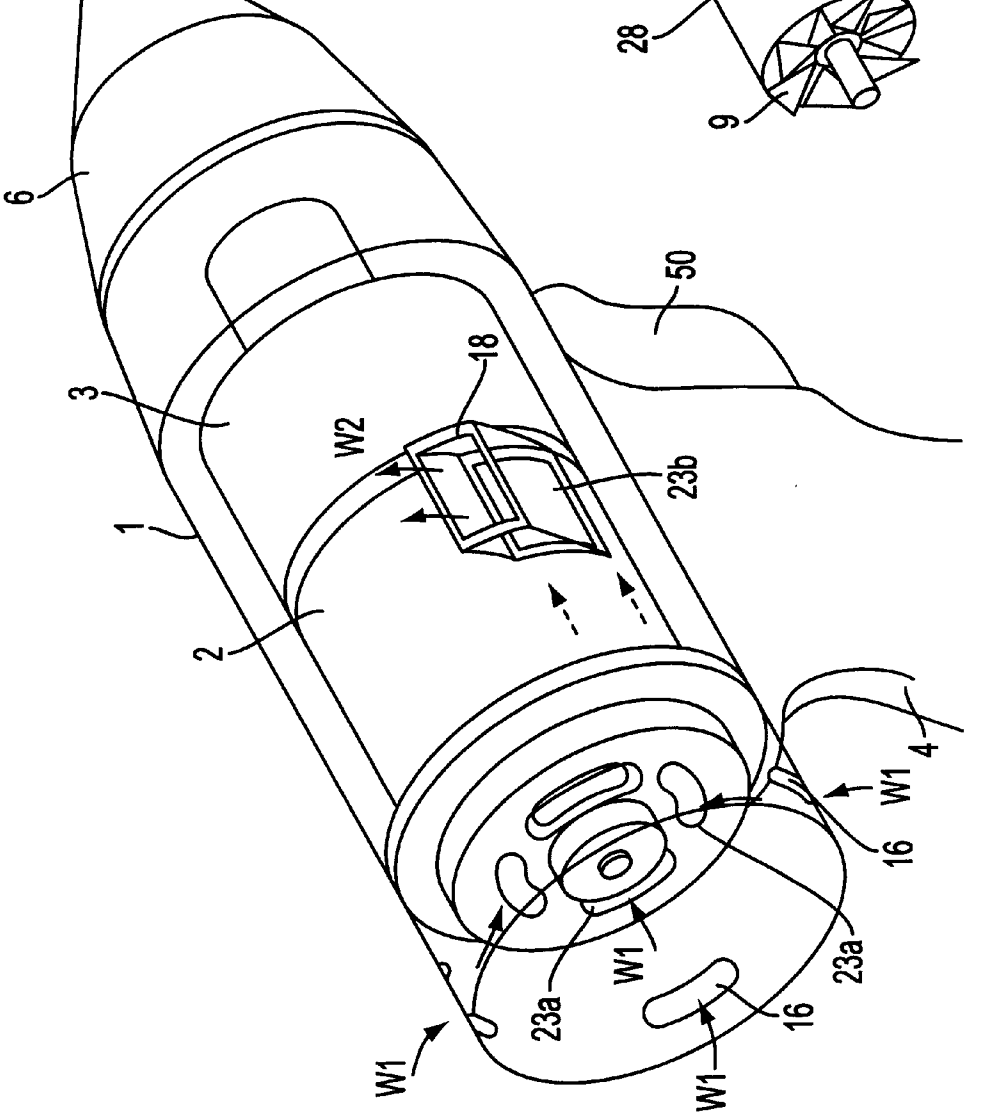
Figure 2:
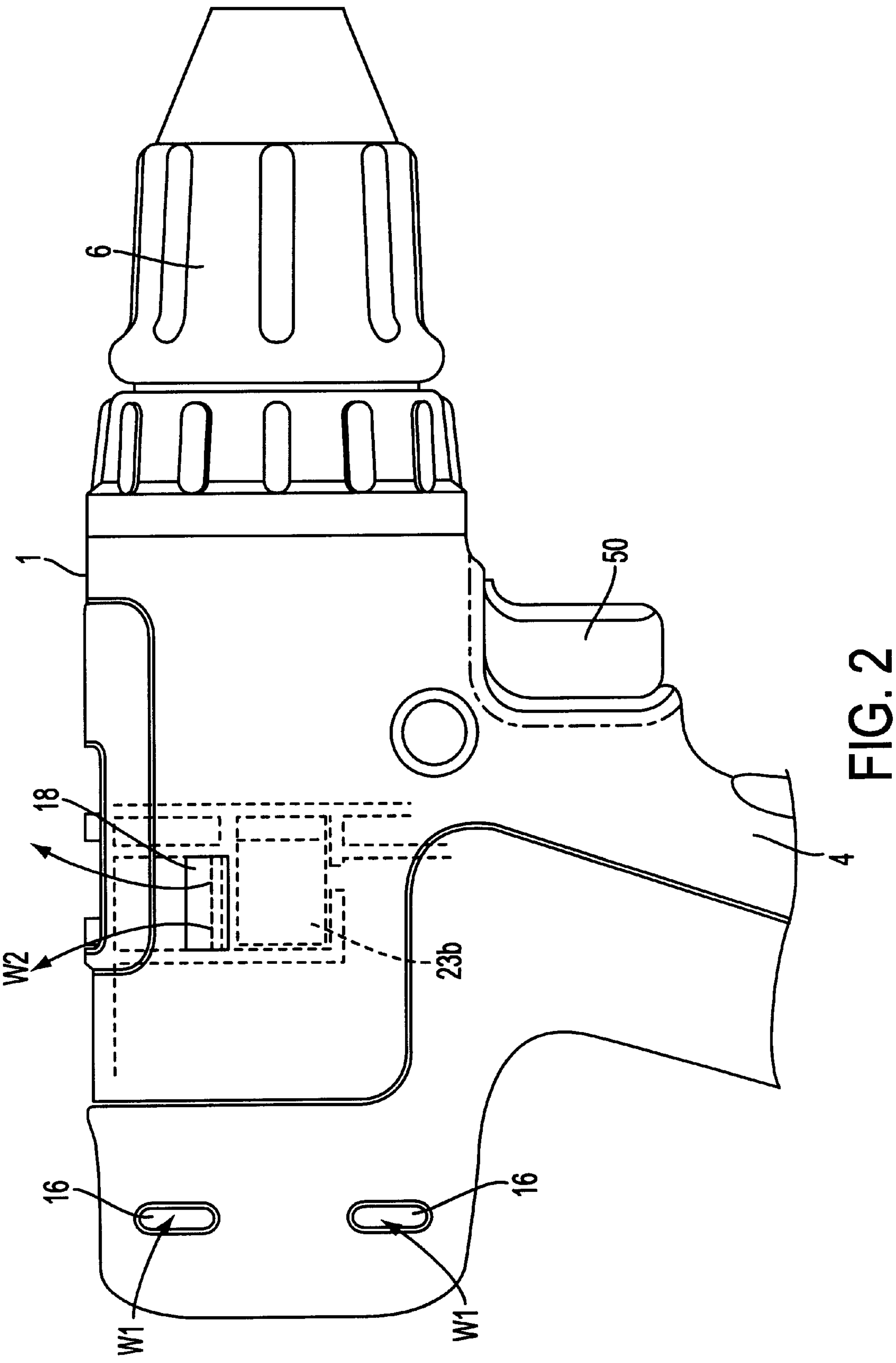
FIG. 2 shows a side view of the tool housing.

A first embodiment of the present invention will now be described. FIGS. 1(*a*)–3 show an electric motor driven tool according to the first embodiment of the present invention. A motor 2 is housed in the rear end of a substantially cylindrical housing or casing 1, which is formed with a grip 4 at the central portion thereof. A decelerator 3 is housed in the front end of housing 1, and a chuck 6 connected to motor 2 is mounted on the end of housing 1 through the decelerator 3.

Figure 4:
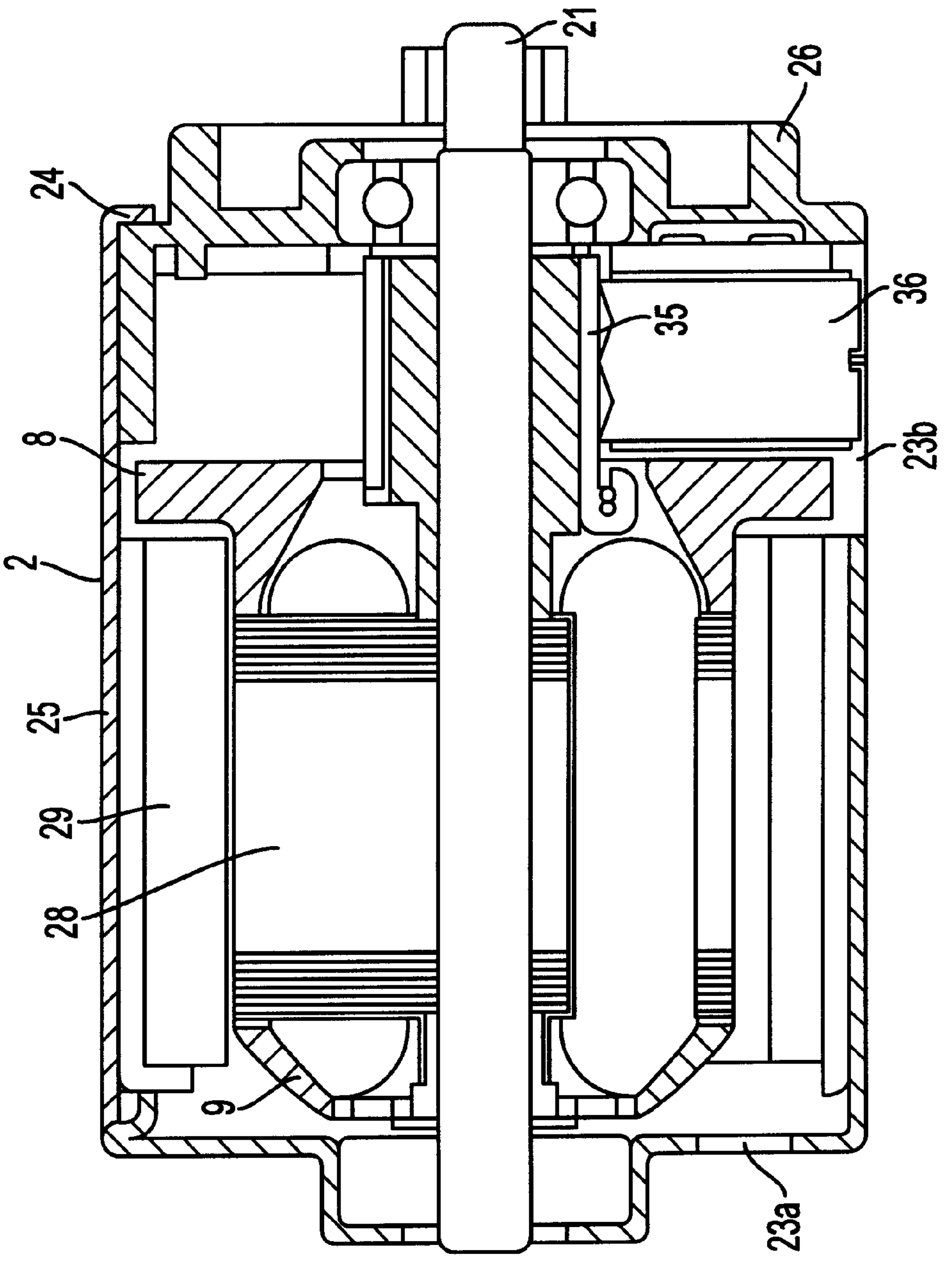
FIG. 4 shows a vertical cross-section of the motor of the present invention.
Figure 5:
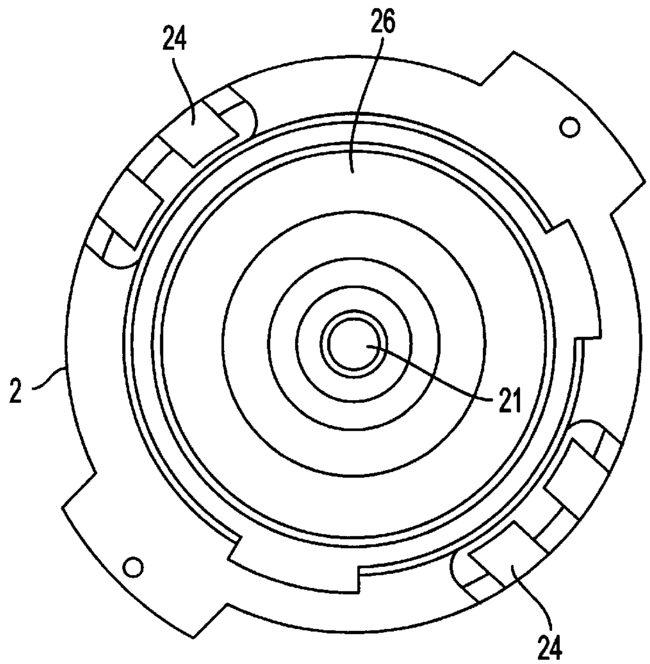
FIG. 5 depicts a front view of the motor of the present invention.
Figure 6:
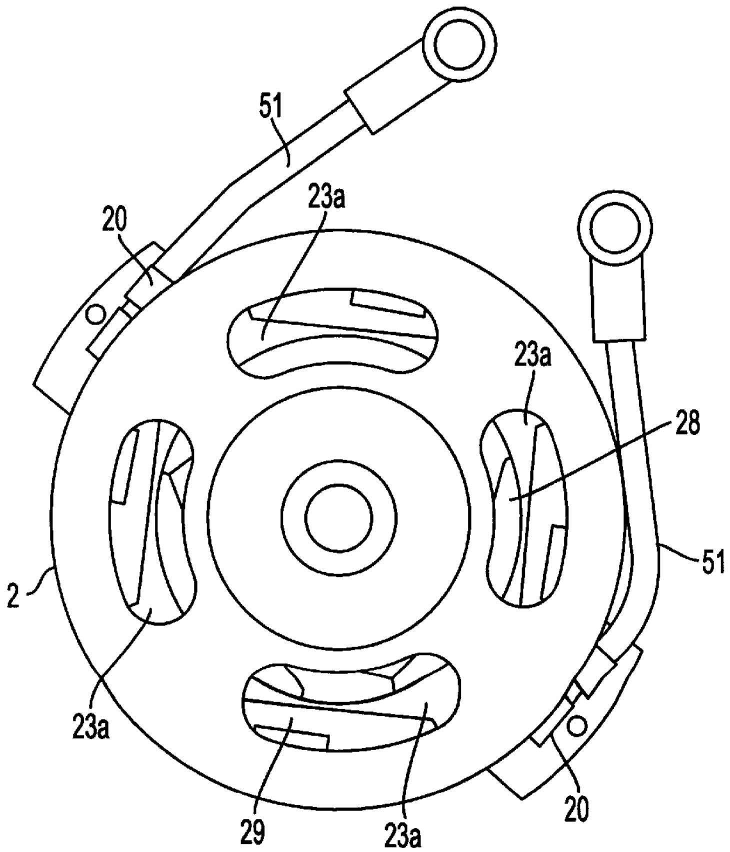
FIG. 6 depicts a rear view of the motor of the present invention.

As shown in FIGS. 4–6, the motor 2 has a magnet 29 affixed to the inner peripheral surface of a motor housing, which includes a cylindrical casing 25 with a closed rear end surface, and an end plate 26 that closes the open front end of casing 25. The motor housing is constructed to rotatably support a rotor 28 affixed to an output shaft 21. As shown in FIGS. 4 and 5 of the drawings, tabs 24 on the casing 25 affix the end plate 26 to the casing 25.

Output shaft 21 protrudes outside from the front end through the end plate 26. A commutator 35 and a brush 36, as well as connecting terminal 20 which is connected to the brush 36, are provided inside of the front end of casing 25. Further, there is a plurality of intake air openings 23*a* on the rear end surface and an exhaust air opening 23*b* on the outer peripheral surface of the front end of casing 25. There is also an exhaust centrifugal fan 8 at the front end of the rotor 28 and an intake axial flow fan 9 at the rear end of the rotor 28.

As shown in FIG. 1(*a*), housing 1 is provided with a plurality of intake openings 16 in the outer periphery of the rear end thereof and an exhaust opening 18 on the outer periphery adjacent the exhaust air opening 23*b* of motor 2.

In the operation of the motor-driven tool according to the present invention, when the motor 2 is rotated, cooling air W1 that enters through intake openings 16 in the rear of housing 1 enters inside the motor 2 through intake air openings 23*a* which open in the rear end of motor 2. The cooling air is propelled toward the front end of the motor 2 by intake axial flow fan 9, and is then passed out through the exhaust air opening 23*b* and exhaust opening 18 by the exhaust centrifugal fan 8.

In addition to the cooling air propelled along the inside of motor 2 in the axial direction, cooling by this cooling air is accomplished forcibly by the combined effects of the intake axial flow fan 9 and exhaust centrifugal fan 8 positioned at the rear and the front, respectively, of rotor 28, which results in an extremely high cooling efficiency. Further, because the exhaust centrifugal fan 8 is located in the front of motor 2 and the intake axial flow fan 9 is located behind the motor 2, the cooling air passes from the rear end of motor 2 to its front end, and cooling is accomplished without any problems regardless of whether or not a decelerator 3 is connected to the front of motor 2.

Furthermore, some of the air that enters through the rear intake openings 16 forms a flow that exits from the exhaust opening 18 after passing through the gap between motor 2 and housing 1, and therefore hot air does not end up accumulating in this gap. Moreover, as is made clear in FIGS. 1(*a*) and 7, exhaust opening 18 points upwardly in the direction of the flow of air generated by the exhaust centrifugal fan 8, and a rib 19 that prevents air from entering between the motor 2 and the housing 1 extends from the inner wall of exhaust opening 18. Thus, not only is exhaust resistance minimal but the exhausted air is not directed toward the side of the tool where grip 4 is located. As a result the air exhausted from exhaust opening 18 does not project onto the user's hand on housing 1.

An exhaust opening 18 having the above-described configuration is provided symmetrically on both the left and right sides of the housing 1 in order to accommodate the situation when the direction of rotation of motor 2 reverses in response to the mode of operation. By setting dimension B greater than dimension A (see FIG. 7) the housing 1 can be formed by a metal mold with a one-direction easy-to-slide construction. By setting dimension A closer to dimension B, the amount of the inner portion of housing 1 seen through exhaust opening 18 when viewed from the side can be limited.

Figure 3:
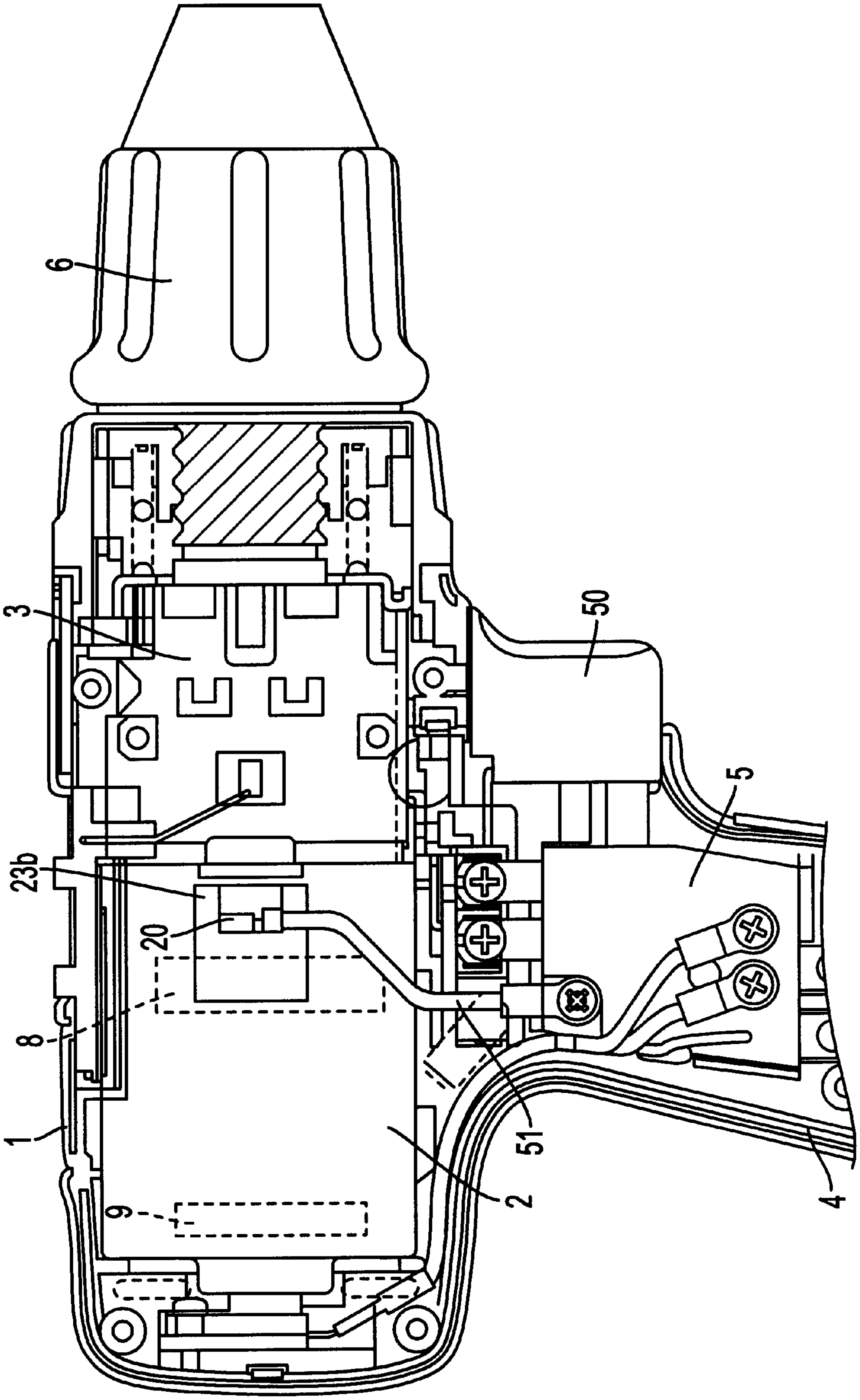
FIG. 3 shows a vertical cross-section of the tool housing.
Figure 7:
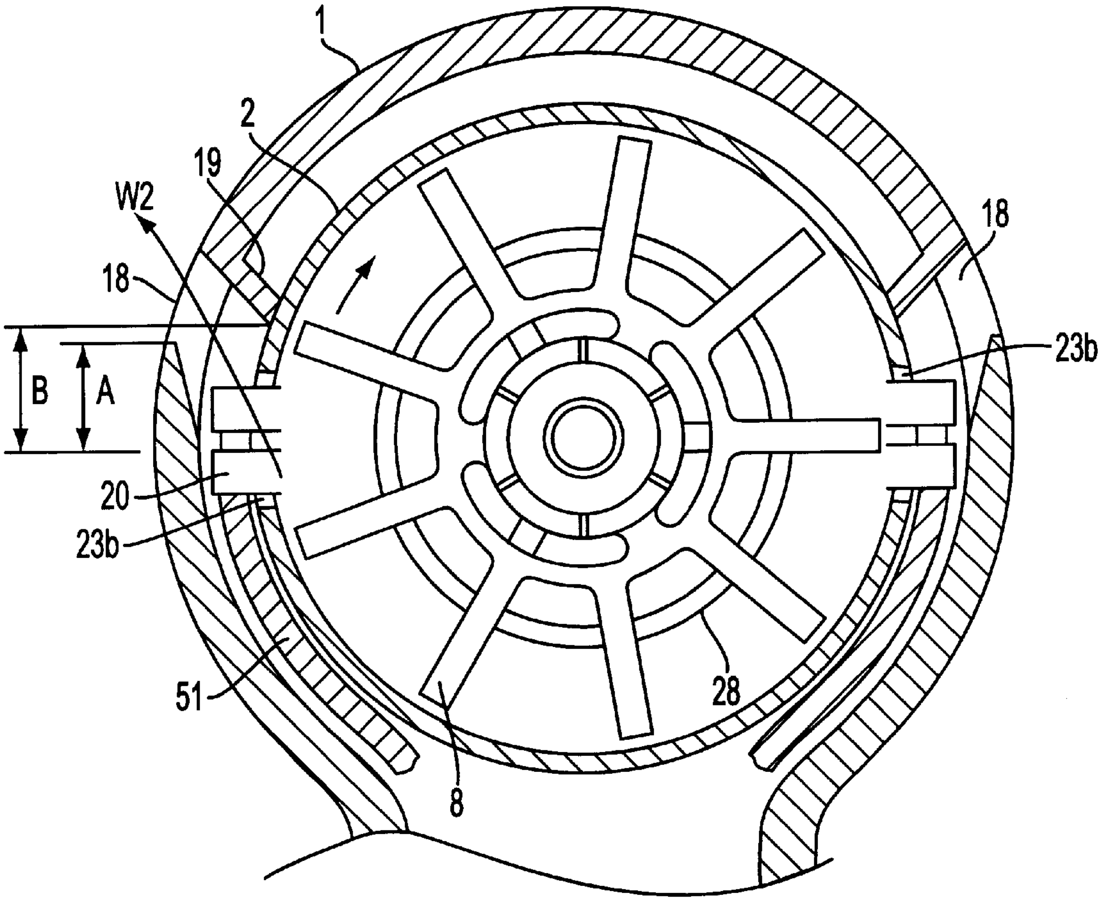
FIG. 7 shows a cross-sectional view of the motor.

Further, as is shown in FIGS. 3 and 7, the connecting terminal 20 of motor 2 which is connected to the switch 5 is located adjacent the exhaust air opening 23*b,* and the power supplied to motor 2 through switch 5 and connecting terminal 20 comes through power wire 51 connected to connecting terminal 20 and positioned along the inner surface of housing 1 as shown in FIGS. 3, 6 and 7. Because the connection between power source wire 51 and connecting terminal 20, which generates heat particularly easily when a large current (such as 100 A) is flowing, is located adjacent the exhaust air opening 23*b,* the connection can be efficiently cooled. Thus, the power voltage does not decrease with the increase in wiring resistance that would accompany a rise in temperature, and so improvement of output characteristics of the motor-driven tool can be expected.

As shown in FIG. 3, the connecting terminal 20 is located almost directly above switch 5 placed on the grip 4. As a result, not only can the distance for connecting the motor 2 to switch 5 be kept at a minimum, but a lead frame can be used for the connection rather than a lead wire.

Figure 8A:
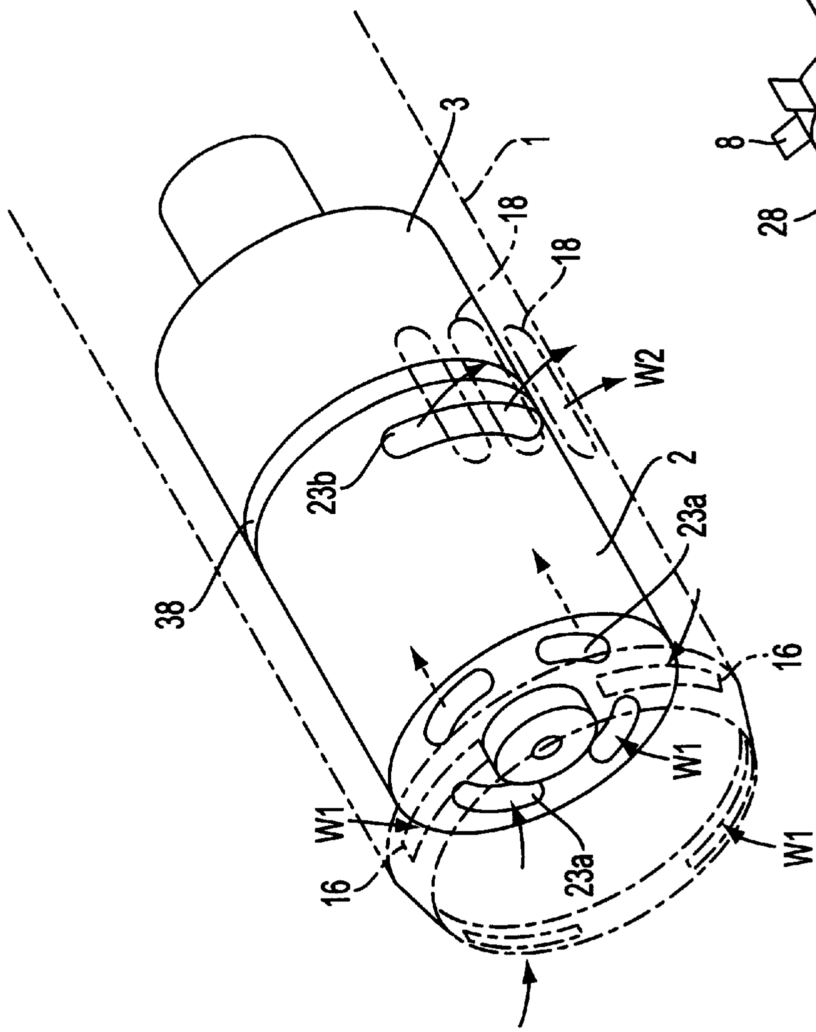
FIGS. 8(*a*) and 8(*b*) depict a second embodiment of the present invention, with FIG. 8(*a*) showing a perspective view of the tool and motor housing according to the second embodiment, and FIG. 8(*b*) is a perspective view of the motor rotor.
Figure 8B:
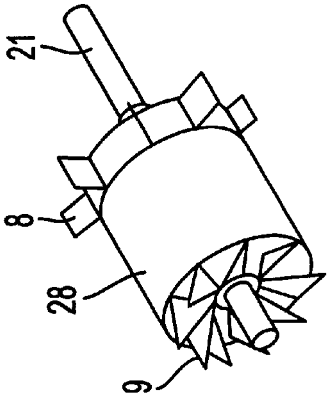

FIGS. 8(*a*)–12 show a second embodiment of the present invention. Basically, the second embodiment is the same as the embodiment described above, but here intake air openings 23*c* have also been provided in the front end surface of motor 2. Ordinarily, the intake air openings 23*c* would be blocked by decelerator 3 in this embodiment as well, but if a through air route that connects the intake air openings 23*c* to the outer periphery of mounting plate 38 for linking decelerator 3 and motor 2 is formed, intake air can be taken in from intake air openings 23*c* as well.

Furthermore, exhaust opening 18 provided in housing 1 is not on the top, but opens pointing toward the side, so that the exhausted air will not hit the user's hand when in contact with the rear of the housing or when grasping the grip.

Figure 9:
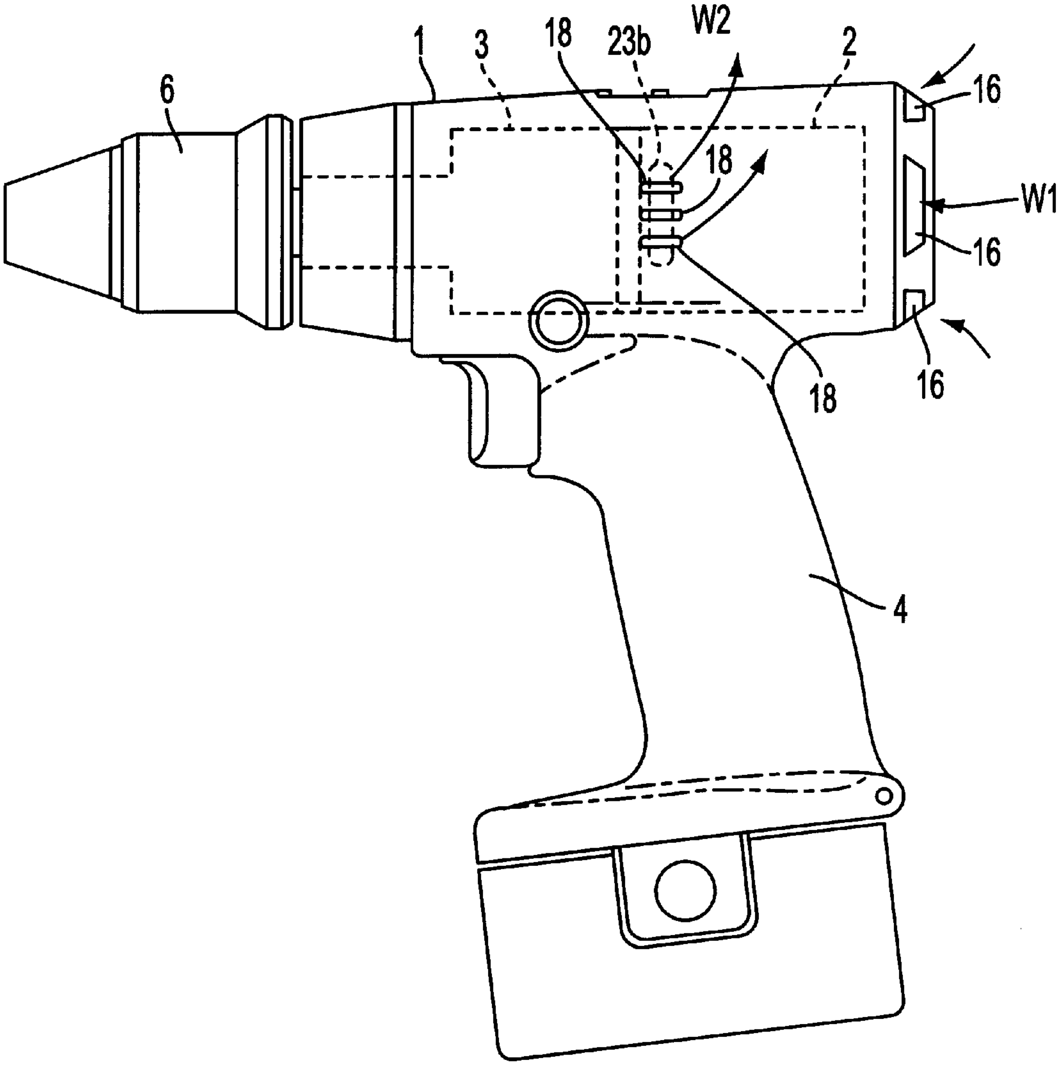
FIG. 9 shows a side view of the tool housing according to the second embodiment.
Figure 10:
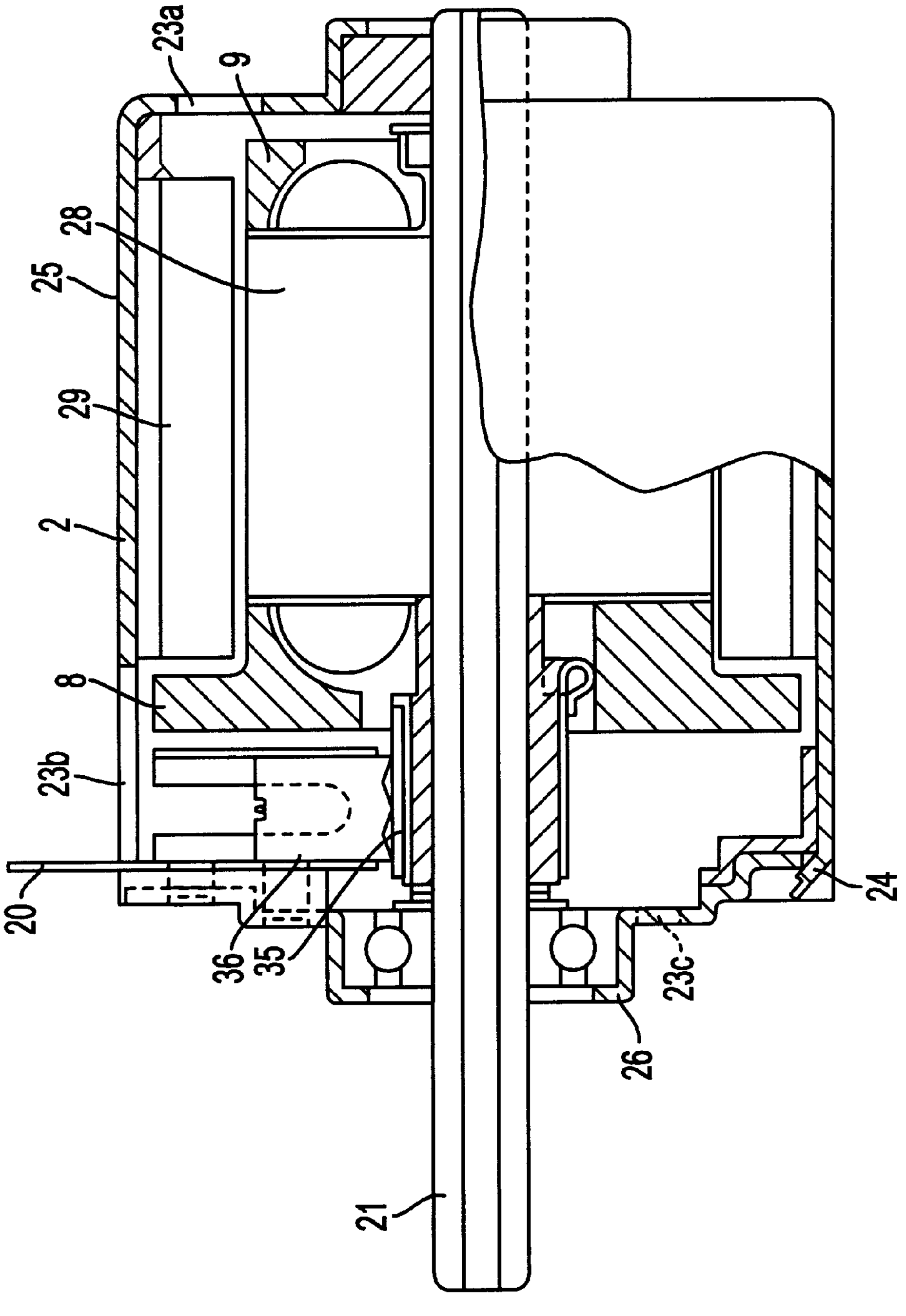
FIG. 10 is a vertical cross-sectional view of the motor of the second embodiment.
Figure 11:
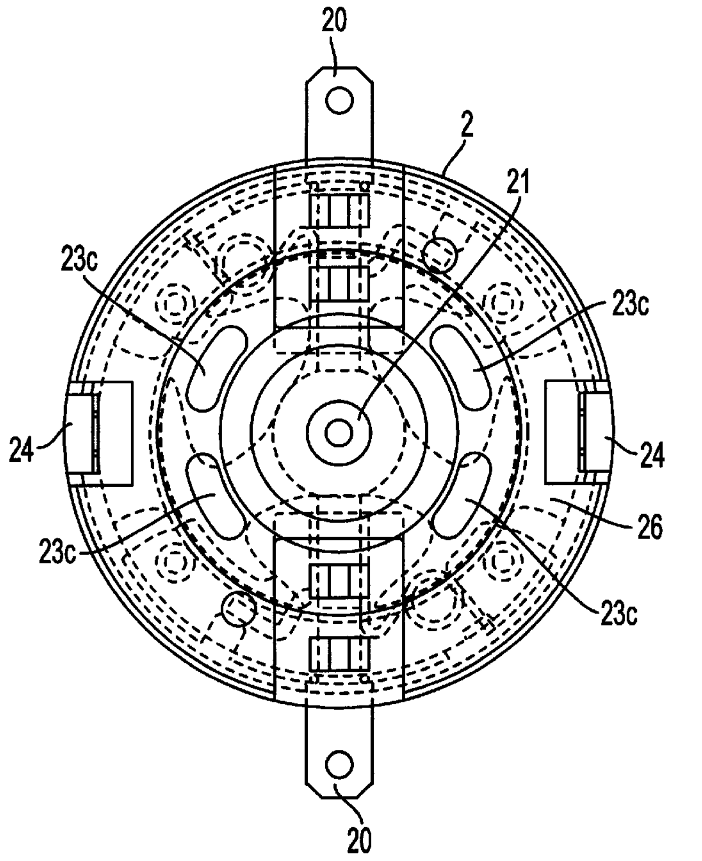
FIG. 11 shows a front view of the motor of the second embodiment.
Figure 12:
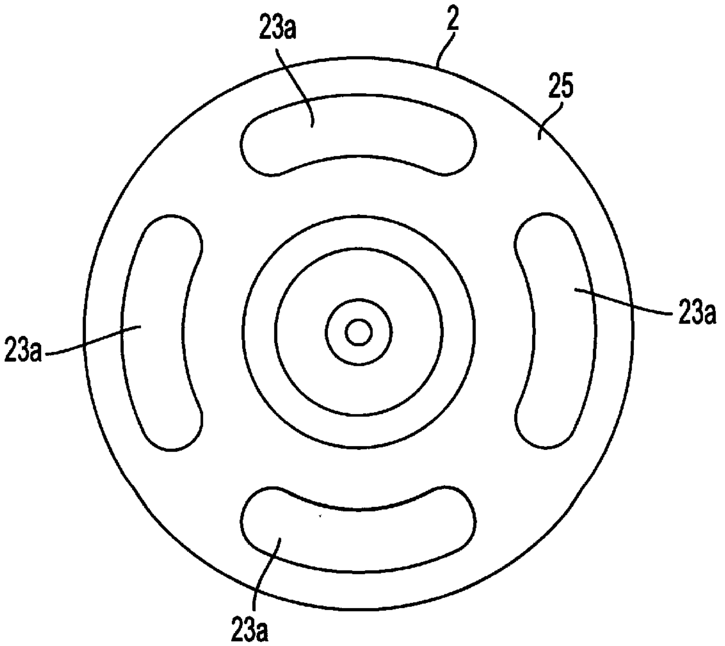
FIG. 12 shows a rear view of the motor of the second embodiment.

Further, intake opening 16 provided at the rear of housing 1 is not on the rear end surface, but is provided in a tapered outer peripheral surface (FIG. 9), such that even if the user's hand comes into contact with the rear end surface when operating the motor-driven tool, the intake opening 16 will not be blocked off.

Figure 13:
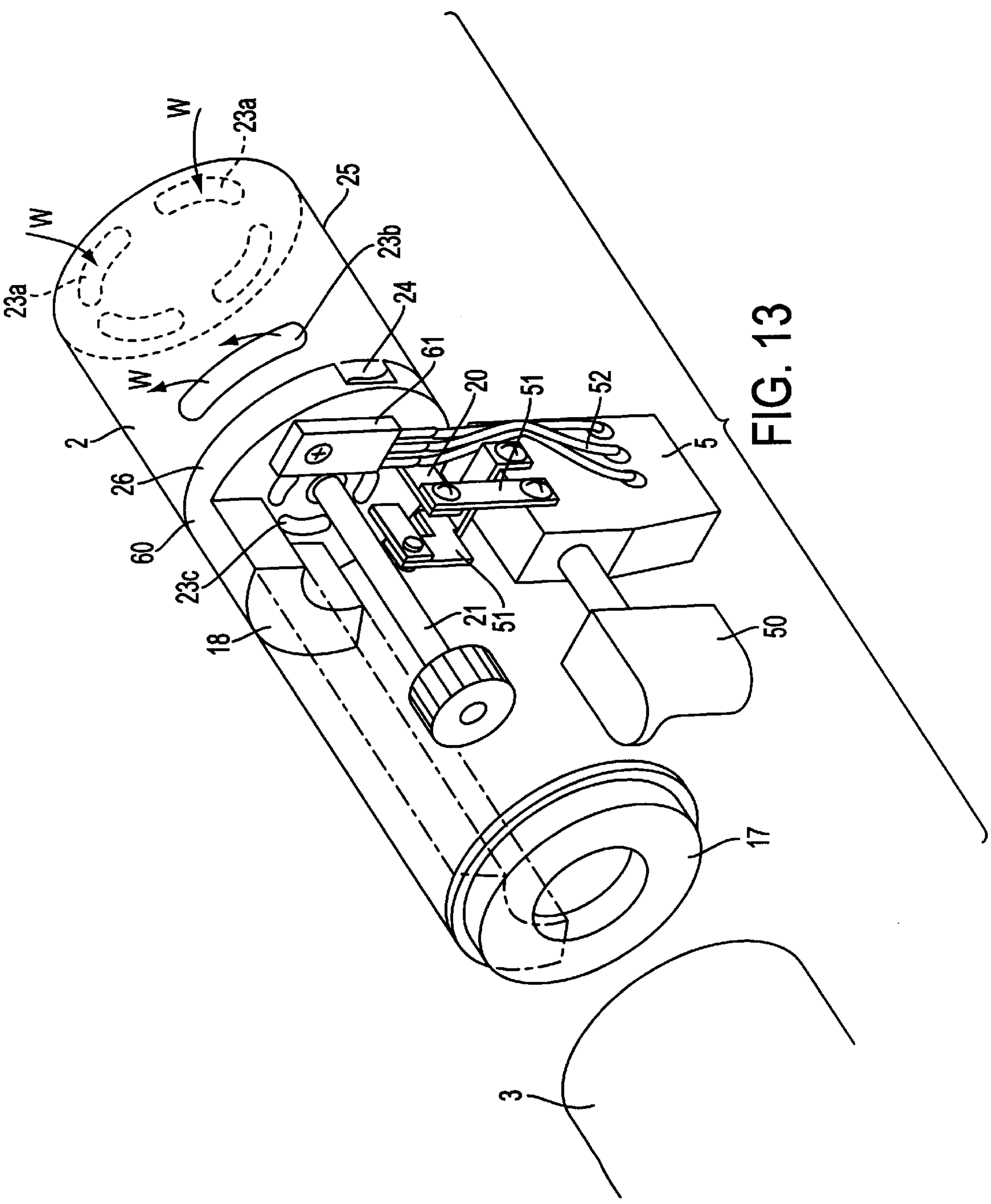
FIG. 13 shows a broken away sectional perspective view of a third embodiment of the invention.
Figure 14:
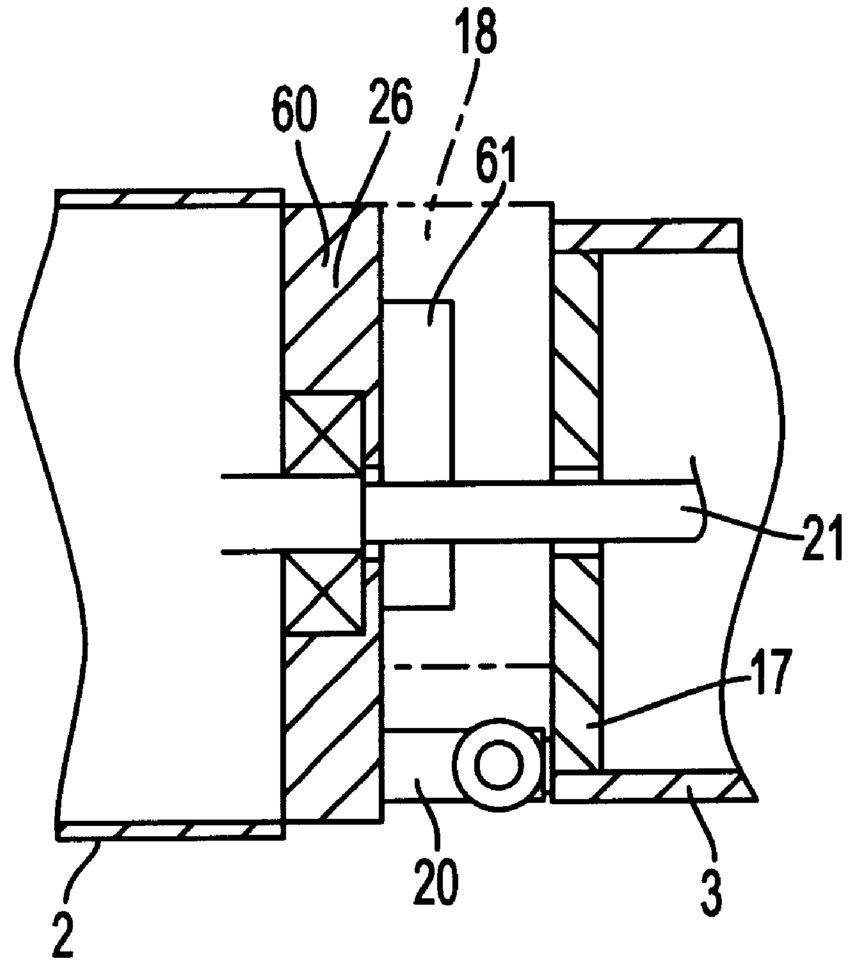
FIG. 14 is a partial cross-sectional view of the third embodiment.
Figures 15A, 15B:
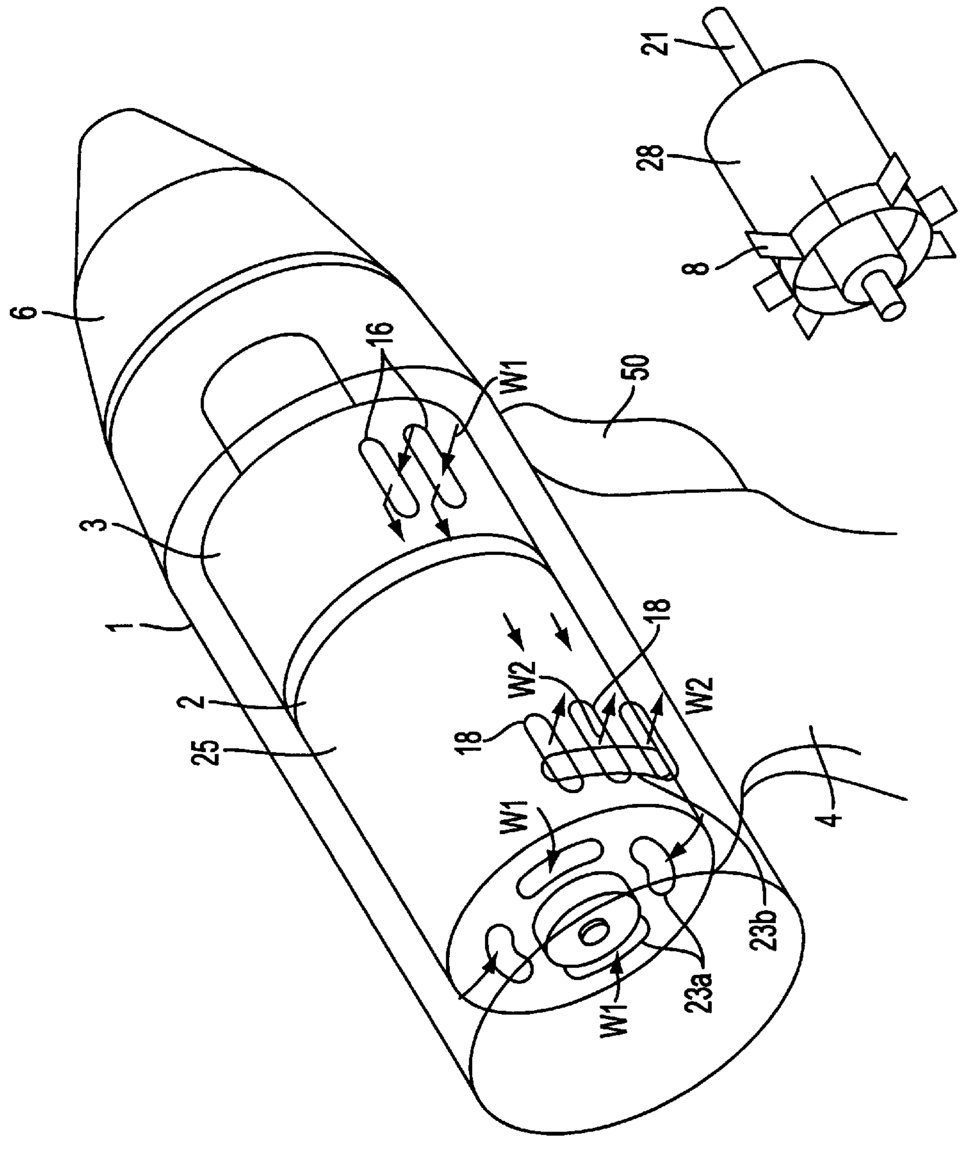
FIG. 15A (PRIOR ART)
FIG. 15B (PRIOR ART)
FIGS. 15(*a*) and (*b*) depict the motor driven tool of the prior art, where FIG. 15(*a*) is a perspective view of the prior art tool and motor housing, and FIG. 15(*b*) is a perspective view of the prior art motor rotor.

FIGS. 13 and 14 show a third embodiment of the present invention in which a radiator plate 60 is formed by making end plate 26 of the motor 2 from a good heat conductor such as aluminum, and switching element 61 is mounted to the outer surface of the end plate 26. Switch 5 and switching element 61 are connected by lead wire 52 and this connection can be kept to a minimum distance as well. Further, by forming a through air opening 23*c* in the end plate 26, end plate 26 can also serve as a radiator plate 60, and cooling air W for the motor 2 can pass through.

With the end plate 26 shown in FIGS. 13 and 14, a ring-shaped mounting plate 17 is interconnected therewith through a connector 18 having an arc-shaped cross-section, and decelerator 3 can be affixed directly to motor 2. Ring-shaped mounting plate 17 can be attached to connector 18 by adhesive, welding, etc., or may be formed unitarily therewith in a one-piece arrangement.

In the present invention as described above, an intake axial flow fan is housed in the rear of the motor and an exhaust centrifugal fan is housed in the front of the motor. The motor is further provided with an intake air opening in the rear side thereof and an exhaust air opening in the side surface of the front end thereof. The cylindrical housing within which the motor is placed has an intake opening that connects to the intake air opening in its rear side, and the housing has an exhaust opening that connects to the exhaust air opening where the front of the motor is located. Therefore, when the motor rotates, air, which passes through the intake opening in the rear of the housing and the intake air opening in the rear of the motor and enters the motor, is propelled to the front end of the motor by the intake axial flow fan, and is then expelled outside by passing through the exhaust air opening in the front of the motor and the exhaust opening in the side of the housing by the exhaust centrifugal fan. Regardless of whether there is a decelerator on the front of the motor, cooling air can pass through the inside of the motor, the flow of this cooling air is smooth, and intake air and exhaust air can be prevented from crossing with each other. The cooling efficiency is extremely high, thus temperature increase of the motor can be prevented effectively, and decreases in the output of the motor which normally would accompany such temperature increases can also be avoided. Not only will portions of the housing not become hot, but because the air is sucked in through the rear and exhausted in the front, no exhaust air will hit the user's hand where it holds the grip or contacts the housing, and thus the user will not suffer any discomfort.

Further, in motor driven tools constructed in accordance with the present invention, the connecting terminal connected to the motor switch is located adjacent the exhaust opening. As a result, increased temperature due to heat generated by wiring when large currents are flowing and decreased power voltage that accompanies such temperature increases can be prevented, and it is thereby possible to produce a tool with good output characteristics.

By providing the motor with a connecting terminal connected to the switch as well as to the commutator and brush on the front end side from which the output shaft connected to the decelerator protrudes, the distance between the switch placed on the grip, which is connected to the central portion of the cylindrical housing, and the connecting terminal of the motor can be shortened. Thus, not only is assembly improved by eliminating the need to form a long lead line, but a decrease in generated heat and improved output can also be obtained.

By connecting a switching element near the front end of the motor in a tool that houses a switching element that drives the motor, the distance between the switch placed on the grip and the switching element can be decreased. Assembly is improved because the need to form a long lead line is eliminated, and the diameter of the housing is decreased because no wiring space needs to be preserved for the lead wire between the housing and the motor.

In a tool in which the switching element for driving the motor is mounted on an end plate formed from a good heat conductor, which end plate closes off the end of the motor, where the end plate also serves as a radiator plate for the switching element, not only is assembly improved by reducing the number of parts because an independent radiator plate is unnecessary, but the end plate also serves to radiate heat from the motor.

By providing a cooling vent opening on the end plate, it is apparent that the presence of the radiating material of the switching element will not prevent cooling air from flowing to the motor, and the passing of cooling air will improve the radiating efficiency of the switching element.

Further, by integrally joining the mounting plate for connecting the decelerator to the end plate, even though the mounting plate for connecting the decelerator can not be separated, the motor and the decelerator can be directly connected. Assembly is improved by reducing the number of parts, and the alignment of the motor and the decelerator is also improved.

Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A motor-driven tool having a grip on which a switch is placed, said grip being connected to a central portion of a cylindrical housing which houses both a motor in a rear end of the cylindrical housing and a decelerator which decelerates the motor output in a front end of said cylindrical housing, and a deceleration rotation output shaft in the front of the housing;

wherein said motor includes a housing, an axial flow fan for air intake in a rear end thereof and a centrifugal fan for exhaust in a front end thereof, said motor housing has an intake air opening in a rear side thereof and an exhaust air opening in a front side surface thereof, wherein said motor is generally cylindrical and includes an output shaft extending from the front end thereof and into engagement with the decelerator, and the front end of the motor housing is closed by the decelerator; and said cylindrical housing includes an intake opening that connects to said intake air opening in the rear side of said motor housing and an exhaust opening that connects to said exhaust air opening of said motor housing at the position where the front of the motor is located.

2. A motor-driven tool in accordance with claim 1, wherein a connecting terminal for the motor which connects to the switch is positioned adjacent at least one of said intake air opening and said exhaust opening of the cylindrical housing.

3. A motor-driven tool in accordance with claim 1, wherein the motor includes a connecting terminal connected to said switch as well as a commutator and brush on the front end thereof from which an output shaft connected to the decelerator protrudes.

4. A motor-driven tool in accordance with claim 1, including a switching element for the motor and in which said switching element is located near the front end of the motor.

5. A motor-driven tool in accordance with claim 4, wherein said switching element for the motor is mounted to an end plate which closes off the end surface of the motor and is formed from a material that is a good heat conductor.

6. A motor-driven tool in accordance with claim 5, including a cooling vent opening formed in said end plate.

7. A motor-driven tool in accordance with claim 5, in which said end plate is formed as a single unit with a mounting plate for connecting said decelerator.

8. A motor-driven tool comprising:

a casing which houses both a motor in a rear end thereof and a decelerator which decelerates the motor output in a front end thereof;

a deceleration rotation output shaft in the front of said casing;

said motor includes a housing, an axial flow fan for air intake at a rear end thereof and a centrifugal fan for exhaust at a front end thereof, said motor housing has at least one intake air opening in a rear side thereof and at least one exhaust air opening in a front side surface thereof;

wherein said motor is generally cylindrical and includes an output shaft extending from the front end thereof and into engagement with the decelerator, and the front end of the motor housing is closed by the decelerator; and said casing includes at least one intake opening that connects to said at least one intake air opening in the rear side of said motor housing and further includes at least one exhaust opening that connects to said at least one exhaust air opening of said motor housing at the position where the front of the motor is located.

9. A motor-driven tool in accordance with claim 8, wherein said casing has a generally cylindrical configuration.

10. A motor-driven tool in accordance with claim 9, wherein said casing is provided with a grip, and said at least one exhaust opening of the casing is configured to direct exhaust air in a direction away from said grip.

11. A motor-driven tool in accordance with claim 10, wherein said at least one exhaust opening of the casing includes two said exhaust openings, each positioned on opposite sides of the casing and configured to direct exhaust air in a direction away from said grip, regardless of the direction of operation of the motor.

12. A motor-driven tool in accordance with claim 8, wherein said casing is provided with a grip.

13. A motor-driven tool in accordance with claim 12, wherein said at least one exhaust opening of the casing is configured to direct exhaust air in a direction away from said grip.

14. A motor-driven tool in accordance with claim 13, wherein said at least one exhaust opening of the casing includes two said exhaust openings, each positioned on opposite sides of the casing and configured to direct exhaust air in a direction away from said grip, regardless of the direction of operation of the motor.

15. A motor-driven tool in accordance with claim 12, including a trigger switch mounted on said grip in close proximity to said at least one exhaust opening of the casing.

16. A motor-driven tool in accordance with claim 15, including a connecting terminal for the motor provided adjacent at least one of said at least one intake air opening and said at least one exhaust opening of the casing, whereby said connecting terminal is cooled by the air passing through said at least one of said intake air opening and said exhaust opening of the casing.

17. A motor-driven tool in accordance with claim 16, further including a connecting member between the trigger switch and the motor, said connecting member having a minimum length.

18. A motor-driven tool in accordance with claim 8, including a switching element for the motor mounted on an end plate which closes off a front end surface of the motor and is formed from a material that is a good heat conductor.

19. A motor-driven tool in accordance with claim 18, including a cooling vent opening formed in said end plate.

20. A motor-driven tool in accordance with claim 19, in which said end plate is formed as a single unit with a mounting plate for connecting said decelerator.

* * * * *

UNITED STATES PATENT AND TRADEMARK OFFICE
CERTIFICATE OF CORRECTION

PATENT NO. : 6,144,121
DATED : November 7, 2000
INVENTOR(S) : Y. Ishida et al.

It is certified that error appears in the above-identified patent and that said Letters Patent is hereby corrected as shown below:

Title page,
Item [75], Inventors, delete "Natsuhara Tsutomu" and insert -- Tsutomu Natsuhara --.

Item [73], Assignee, after "Works" insert -- , --.

Signed and Sealed this

Twenty-sixth Day of February, 2002

*Attest:*

JAMES E. ROGAN
*Director of the United States Patent and Trademark Office*

*Attesting Officer*